July 3, 1945.　　　M. SUTTON ET AL　　　2,379,550
HYDROCARBON CONVERSION SYSTEM
Filed Dec. 4, 1942
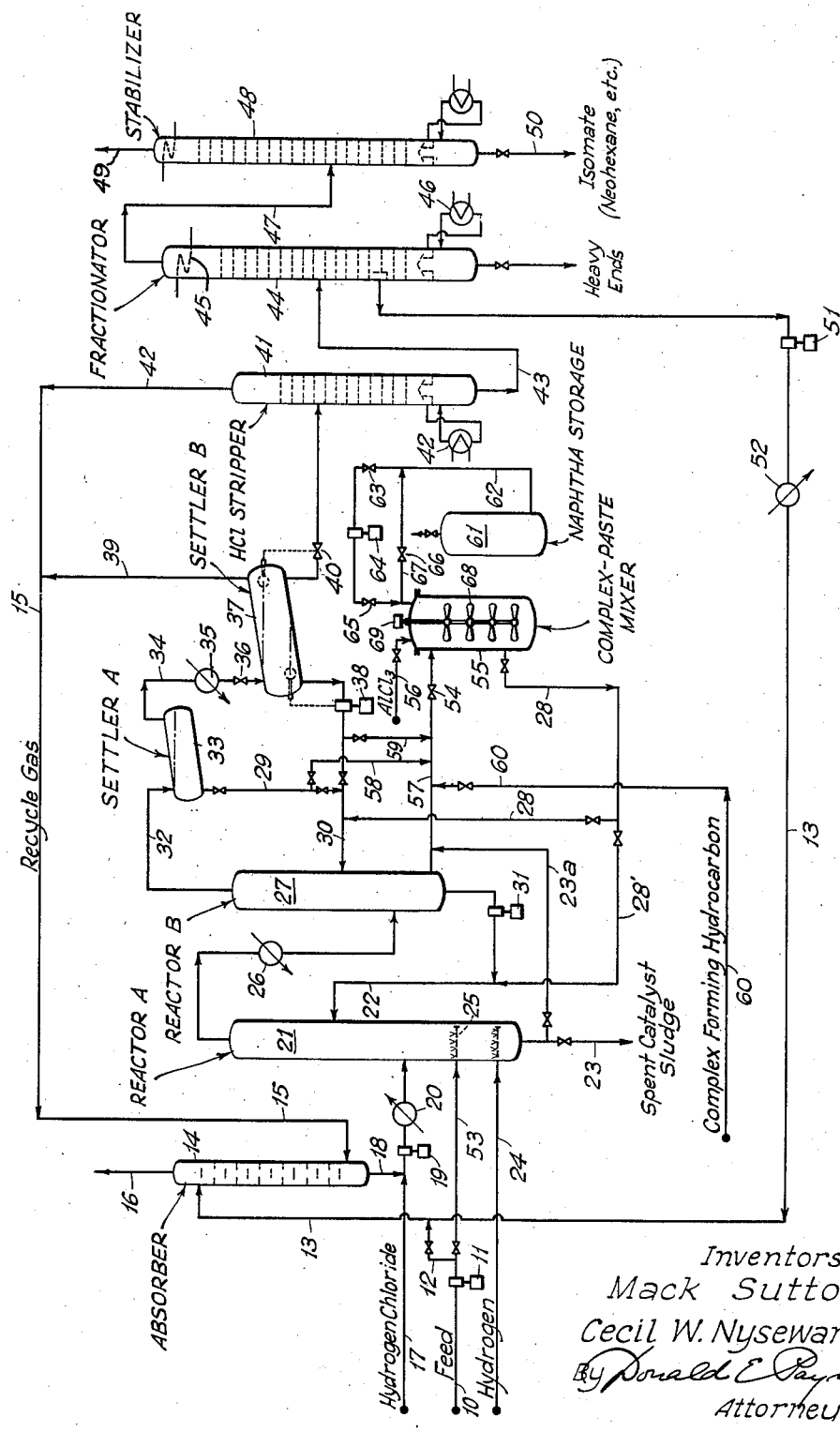
Inventors:-
Mack Sutton
Cecil W. Nysewander
By Donald E. Payne
Attorney Patented July 3, 1945

2,379,550

UNITED STATES PATENT OFFICE 2,379,550

HYDROCARBON CONVERSION SYSTEM

Mack Sutton, Hammond, and Cecil W. Nysewander, Highland, Ind., assignors to Standard Oil Company, Chicago, Ill., a corporation of Indiana Application December 4, 1942, Serial No. 467,824

4 Claims. (Cl. 260—683.5)

This invention relates to a hydrocarbon conversion system employing an aluminum halide-hydrocarbon complex catalyst and the invention pertains more particularly to an improved method and means for the introduction of make-up aluminum chloride thereto. The invention is primarily directed to improvements in a system for isomerizing light hydrocarbons but many features thereof are applicable for effecting alkylation, disproportionation, polymerization and other conversions effected by aluminum halide-hydrocarbon complexes.

In light hydrocarbon conversion systems employing a liquid aluminum halide-hydrocarbon complex as a catalyst, the catalyst complex eventually loses its activity to a considerable extent and it is necessary to either replace the complex by a fresher or more active complex or to add additional aluminum chloride to the complex during the course of the reaction. The addition of make-up aluminum chloride to catalyst complex in a reactor system maintained under substantial superatmospheric pressure has given rise to many serious problems. It is necessary to obtain rapid and intimate dispersion of the added aluminum chloride throughout the complex mass in the reactor. It is necessary to prevent line plugging in the make-up aluminum chloride system. It is necessary to avoid the introduction of contaminants. An object of our invention is to provide a solution of these problems.

It has been proposed to introduce such make-up aluminum chloride as a solution in charging stock, but charging stock usually will not retain an appreciable amount of aluminum chloride in solution, it usually contains dissolved hydrogen chloride which would produce undesirable vigorous reactions (resulting in coking, etc.) before the charging stock meets the body of complex mass and it is usually introduced at a different stage from that at which it is desired to introduce the make-up aluminum chloride. Solvents for make-up aluminum chloride are undesirable because they contaminate the reaction system and result in undesirable by-products. The slurry method of introducing make-up aluminum chloride offers a vexatious problem of maintaining relatively high turbulence at all times because if the slurry is allowed to remain quiescent for any appreciable amount of time the aluminum chloride settles out and causes a plugging of lines and valves. The object of our invention is to avoid the difficulties in this connection which have heretofore confronted the art and to provide a radically new method and means for introducing make-up aluminum chloride.

We have discovered that make-up aluminum chloride may be added to a high pressure reaction chamber with remarkable ease and that the make-up aluminum chloride thus added is dispersed throughout the reactor with remarkable rapidity when the make-up aluminum chloride is supplied in the form of a paste, particularly when the paste is prepared from a complex which is still at least partially active. We have found that about ½ to 2 pounds or more of aluminum chloride can be incorporated in one pound of aluminum chloride-hydrocarbon complex to produce a paste which is of approximately the consistency of ordinary tooth-paste. This paste is radically different from solutions because the aluminum chloride particles remain substantially undissolved so that they may be dispersed in solid form throughout the complex in the reactor. The paste radically differs from a slurry in that it prevents any settling or sedimentation problems. We have found that the aluminum chloride-complex not only keeps the aluminum chloride particles in a relatively permanent suspension but it also acts as a lubricant to facilitate the injection thereof through conduits and distributors in the reaction chamber.

Slurries and solutions may be handled by ordinary pumps but our paste requires a different type of injection means. An important feature of our invention is our improved method and means for preparing the paste and injecting the paste into a high pressure conversion system. Preferably the injection is effected by hydraulic pressure, the pressure in the conversion system serving to inject complex into the paste mixer and to displace pressuring fluid therefrom while the pumping of the pressuring fluid in a reverse direction serves to introduce paste from the mixer to the high pressure conversion reactor.

The invention will be more clearly understood from the following detailed description read in conjunction with the accompanying drawing which forms a part of the specification and which is a schematic flow diagram of a light naphtha isomerization system employing our new method and means for supplying make-up aluminum chloride.

The process illustrated in the drawing is isomerization of debutanized light naphtha having a 90% point below about 180° F. and preferably not higher than about 160° F. Such a charging stock consists essentially of pentanes and hexanes but it may contain a small amount of aromatics and a somewhat larger amount of naphthenes. This process may be operated for the production of an aviation fuel or blending stock called isomate or it may be operated for the production of neohexane, isopentane, etc. Our invention is equally applicable to systems for isomerizing naphthenes, i. e., for converting alkyl cyclopentanes to cyclohexanes and methyl cyclohexanes. It is also equally applicable to the isomerization of normal butane to isobutane except that in such process it is desirable to operate in the absence of added hydrogen. Many features of our invention are applicable to other processes employing aluminum chloride hydrocarbon complexes such as processes for polymerizing olefins, processes for alkylating olefins with isoparaffins or aromatics, etc.

In the specific example herein set forth the charging stock from source 10 may be introduced by pump 11 through lines 12 and 13 to the upper part of absorber tower 14. Recycled gases containing hydrogen chloride are introduced at the base of this tower through line 15. Gases denuded of hydrogen chloride are removed from the top of the tower through line 16. Make-up hydrogen chloride may be added from line 17 either to the base of tower 14 or to line 18 leaving the base of this tower. The charging stock which now contains about 2 to 10%, for example about 6%, hydrogen chloride is introduced by pump 19 through heater 20 into the A reactor 21. Catalyst complex may be introduced into reactor 21 through line 22 and substantially spent catalyst complex may be withdrawn from the reactor through line 23.

The catalyst complex is preferably an aluminum halide hydrocarbon complex of the type described in U. S. Patents 2,260,279 and 2,300,249, etc. Tower 21 may be 15 to 40 feet in height and the catalyst level may be about two-thirds to three-fourths of the distance from the tower bottom to the tower top. The reactor is preferably operated under a pressure of the order of about 850 pounds per square inch although pressures may range from a few hundred to several thousand pounds. The temperature in this reactor is preferably of the order of 250 to 300° F. although it may range from about 100° F. to about 400° F. The space velocity employed may be about .1 to 5 but is preferably about 0.5 to 2 volumes of liquid feed per hour per volume of liquid catalyst complex in the tower.

In the drawing we have shown the hydrogen chloride introduced into the reactor at an intermediate point instead of at the bottom thereof. Hydrogen is introduced into the reactor through line 24 at a point substantially below the point at which hydrogen chloride is introduced thereto so that that portion of the reactor between the point of hydrogen chloride inlet and the point of hydrogen inlet may constitute a stripping zone 25. Hydrogen may be introduced into the system at the rate of about 50 to 300, usually about 150 to 200 cubic feet (measured standard conditions) per barrel of stock charged and this hydrogen may be produced from hydrocarbons in the refinery and thus be contaminated with small amounts of carbon monoxide. As the hydrogen passes upwardly in stripping zone 25 of reaction chamber 21 any carbon monoxide in the hydrogen is scrubbed out of it by the downflowing catalyst complex. At the same time the upflowing hydrogen acts as a stripping gas for recovering hydrogen chloride. By employing this countercurrent scrubbing zone at the base of the reactor we thus purify the introduced hydrogen by means of spent complex and we simultaneously recover from the spent complex valuable hydrogen chloride which would otherwise be withdrawn through line 23 with spent catalyst. When there are no objectionable contaminants in the hydrogen, however, the several streams may all be introduced near the base of the reactor.

The total liquid-vapor-gas stream from the top of reactor 21 passes through cooler 26 to a low point in reactor 27. Make-up aluminum chloride from line 28 and recycled catalyst from line 29 are introduced into reactor 27 through line 30. Here again the catalyst level is maintained at a relatively high point in the reactor and the liquid-vapor-gas stream passes upwardly through the reactor at the space velocity hereinabove stated, the space velocity referring to the total catalyst in both reactors. Reactor 27 is preferably operated within the approximate temperature range of 200 to 250° F. Catalyst from the base of this reactor is withdrawn by pump 31 for introduction by the line 22 to the reactor 21.

The product stream from the top of reactor 27 is introduced by line 32 to warm settler 33 from which settled catalyst may be returned to reactor 27 by line 29 as hereinabove described. The product stream leaves settler 33 through line 34, is cooled in cooler 35 and then passes through pressure reduction valve 36 to cool settler 37 which may operate at a pressure of about 300 to 350 pounds per square inch and at substantially atmospheric temperature. Catalyst material settled out in the cool settler may be returned by pump 38 to reactor 27. Gases, chiefly hydrogen and hydrogen chloride with small amounts of methane, ethane, etc. leave the top of settler 37 through line 39 and are recycled by line 15 to the base of absorber 14. The liquid hydrocarbon reaction products are introduced from settler 37 by valve 40 to the upper part of hydrogen chloride stripper 41 which is provided with heating means 42 at its base and which may be provided with reflux means (not shown) at its top. Hydrogen chloride and light gases are thus stripped out of the products and are withdrawn through line 42 to line 15 for recycling to absorber 14.

The stripped products from the bottom of stripper 41 may be neutralized with a caustic solution and washed with water in suitable mixing and settling systems (not shown). It may then be introduced by line 43 to fractionating tower 44 which is provided with suitable reflux means 45 at its top and suitable reboiler means 46 at its base. Neohexane and lighter hydrocarbons may be taken overhead through line 47 to stabilizer 48 which is likewise provided with suitable reflux and reboiler means, the stabilizer gases being withdrawn through line 49 and the isomate rich in neohexane being withdrawn through line 50.

A part of the heavier hydrocarbons withdrawn as a side stream from the lower part of fractionator 44 may be returned by pump 51, cooler 52 and line 13 to the top of absorber 14. When a sufficient amount of oil is thus recycled to the absorber for recovering the hydrogen chloride from recycled gases introduced through line 15, we may introduce the feed stock through line 53 directly into reactor 21 below the point at which any hydrogen chloride is introduced thereto in order to provide a liquid scrubbing zone in the reactor 21. By this procedure the introduced feed stock scrubs hydrogen chloride from spent catalyst as said catalyst moves downwardly to discharge line 23 and at the same time any catalyst poisons which might be present in the feed stock are extracted therefrom by the downwardly moving spent complex. Thus we may utilize not only the introduced hydrogen but also the introduced charging stock for recovering valuable materials from spent catalyst and in both cases any impurities in the introduced ingredients will be scrubbed out of them before they reach that portion of the reaction chamber in which the isomerization is effected.

Our preferred vehicle for preparing make-up aluminum chloride-complex paste is active catalyst complex from the conversion system itself. Such complex may be withdrawn from the B reactor 27 through line 57. Alternatively, or in addition to such complex, we may employ settled complex from line 29 introduced by line 58 to line 57 or we may employ catalyst or complex introduced by pump 38 through line 59 to line 57. Even though the catalyst which leaves the A reactor 21 through line 23 may be substantially spent as far as the isomerization reaction is concerned, it may still be employed as a vehicle for making our aluminum chloride-complex paste and we may thus withdraw about one-third of the spent catalyst sludge through line 23a to line 57 for preparing our aluminum chloride-complex paste.

It is not essential that the paste be prepared from materials which are by-products of the conversion itself (although this is usually preferred) and complex-forming hydrocarbons may be introduced into the system from line 60 to line 57. When complex-forming hydrocarbons are introduced through line 60, it may be desirable to introduce enough hydrogen chloride into complex-paste mixer 55 to expedite complex formation prior to or during the preparation of the aluminum chloride paste itself. This added hydrogen chloride may be introduced at a low point in the paste mixer through a suitable line (not shown) and any unconsumed hydrogen chloride may be withdrawn from the top of the mixer through a suitable line (not shown).

In a 5000 barrel per day isomerization plant the make-up aluminum chloride requirements may be of the general order of 300 pounds per hour although it should be understood that the precise amount of aluminum chloride will depend on the quality or activity of the aluminum chloride itself, the nature of the stock charged, the extent of conversion to be effected, etc. In a specific example, we may withdraw about 12 gallons of complex per hour to one or more complex-paste mixers 55 for making up a paste with the approximately 300 pounds per hour of aluminum chloride. A preferred procedure for making up complex will now be described in greater detail.

Associated wtih mixer 55 is a storage tank 61 for naphtha or inert pressuring fluid. Such fluid may be introduced through line 62, valve 63, pump 64 and valve 65 into mixer 55. Alternatively pump 64 may be stopped, valves 63 and 65 may be closed and this pressuring fluid may be returned through line 67 and opened valve 66 back to storage tank 61. At the beginning of the mixing cycle mixer 55 may be substantially filled with naphtha or inert liquid or pressuring fluid at atmospheric or relatively low pressure. The desired amount of aluminum chloride, preferably of about 30 mesh particle size, is then introduced into the mixer through line or hopper 56, thereby displacing a part of the naphtha or pressuring fluid into tank 61. The aluminum chloride inlet of mixer 55 is then sealed and valve 54 in line 57 is opened to permit the complex (or complex-forming liquid) from any of the sources hereinabove designated to enter mixer 55 and displace further amounts of the naphtha or pressuring fluid. The amount of complex introduced may be readily determined by simply gauging the amount of naphtha or other liquid displaced to tank 61. When the required amount of complex has been introduced, the mixing device 68 is operated by suitable driving means 69 to intimately mix the aluminum chloride with the introduced complex and to form a paste about the consistency of ordinary tooth-paste. This paste is stable and may stand indefinitely without tendency of aluminum chloride particles to settle out. It is possible that there may be a loose chemical combination of the aluminum chloride particles with the complex but at any rate the aluminum chloride is intimately and uniformly dispersed throughout the complex in the resulting paste. This paste should contain about 80 to 90% or more of aluminum chloride, about 87 or 88% being preferred. A fresh complex may be associated with more hydrocarbon material than a more spent complex; thus 2 pounds of added make-up aluminum chloride to one pound of fresh complex gave about 88 weight percent aluminum chloride in the resulting paste, while about 1.6 pounds of added make-up to one pound of a used complex gave about 87 weight percent aluminum chloride in the resulting paste. The paste may be prepared at about room temperature, or at temperatures up to 200° F. or more. Paste mixtures prepared at the higher temperatures are more fluid for a given amount of aluminum chloride, or they carry a larger amount of aluminum chloride for a given consistency. The consistency does not appear to change on standing, at least for periods of a week or more.

After the complex has thus been prepared, valve 66 is closed, valves 63 and 65 are opened and pump 64 is operated to force the naphtha or pressuring fluid back into mixer 55 thus displacing the paste therefrom and forcing said paste either through line 28 and line 30 to the B reactor 27 or through line 28' and line 22 to the A reactor 21. Ordinarily we prefer to introduce the paste into B reactor 27 and to transfer complex from the base of the B reactor to an intermediate point in the A reactor by means of pump 31. When the gauge on tank 61 indicates that substantially all of the complex-paste has been displaced from mixer 55, another batch of paste is prepared in the manner hereinabove described.

While we have described a specific example of our invention as applied to an isomerization system it should be understood that the invention is not limited to the specific details hereinabove recited since many modifications and alternatives will be apparent to those skilled in the art from the above detailed description.

We claim:

1. The method of introducing make-up aluminum chloride into an aluminum chloride hydrocarbon conversion zone operating at superatmospheric pressure which method comprises withdrawing complex from said zone to a mixing zone thereby displacing a pressuring fluid from said mixing zone, adding make-up aluminum chloride to said mixing zone in amounts sufficient to form a paste in said complex, mixing said aluminum chloride with said complex to form said paste and injecting said paste into a superatmospheric pressure reaction zone by reintroducing pressuring fluid into said mixing zone under sufficient pressure to displace the paste therefrom.

2. The method of introducing catalyst material into an aluminum chloride hydrocarbon conversion zone operating at superatmospheric pressure and containing liquid aluminum chloride hydrocarbon complex, which method comprises withdrawing liquid aluminum chloride-hydrocarbon complex from said conversion zone into a mixing zone thereby displacing pressuring fluid from said mixing zone, introducing catalyst material into said mixing zone, intimately mixing said material with said complex in said mixing zone whereby said material is incorporated in the complex, and transferring said complex with catalyst material incorporated therein back into said superatmospheric pressure conversion zone by reintroducing pressuring fluid into said mixing zone under sufficient pressure to effect such transfer.

3. The method of claim 2 wherein the catalyst material is solid aluminum chloride.

4. The method of claim 2 wherein the catalyst material is solid aluminum chloride and the proportions thereof are within the approximate range of ½ to 2 pounds of aluminum chloride per pound of complex admixed therewith in the mixing zone.

MACK SUTTON.
CECIL W. NYSEWANDER.